(12) United States Patent
Xu et al.

(10) Patent No.: US 11,055,602 B2
(45) Date of Patent: Jul. 6, 2021

(54) DEEP LEARNING ASSIGNMENT PROCESSING METHOD AND APPARATUS, DEVICE AND STORAGE MEDIUM

(71) Applicant: BEIJING BAIDU NETCOM SCIENCE AND TECHNOLOGY CO., LTD., Beijing (CN)

(72) Inventors: Dongze Xu, Beijing (CN); Faen Zhang, Beijing (CN); Kai Zhou, Beijing (CN); Qian Wang, Beijing (CN); Kun Liu, Beijing (CN); Yuanhao Xiao, Beijing (CN); Jiayuan Sun, Beijing (CN); Lan Liu, Beijing (CN); Tianhan Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 341 days.

(21) Appl. No.: 16/159,317

(22) Filed: Oct. 12, 2018

(65) Prior Publication Data
US 2019/0114527 A1    Apr. 18, 2019

(30) Foreign Application Priority Data
Oct. 13, 2017    (CN) .......................... 2017109547559

(51) Int. Cl.
*G06N 3/02* (2006.01)
*G06F 3/0483* (2013.01)
(52) U.S. Cl.
CPC ............. *G06N 3/02* (2013.01); *G06F 3/0483* (2013.01)

(58) Field of Classification Search
CPC .......... G06N 3/02; G06N 3/105; G06N 20/00; G06F 3/0483
USPC ................................................ 706/12, 15, 20
See application file for complete search history.

(56) References Cited

U.S. PATENT DOCUMENTS

| 2015/0006443 | A1* | 1/2015 | Rose ..................... G06K 9/6249 706/12 |
| 2016/0034809 | A1* | 2/2016 | Trenholm ................. G06F 8/35 706/20 |
| 2016/0306876 | A1* | 10/2016 | Nichols ................... G06N 7/005 |
| 2016/0321559 | A1* | 11/2016 | Rose ........................ G06N 20/00 |

(Continued)

FOREIGN PATENT DOCUMENTS

| CN | 105808500 A | 7/2016 |
| CN | 106227397 A | 12/2016 |
| CN | 106529673 A | 3/2017 |

*Primary Examiner* — Michael Roswell
(74) *Attorney, Agent, or Firm* — Seed IP Law Group LLP (57) ABSTRACT

The present disclosure provides a deep learning assignment processing method and apparatus, a device and a storage medium. It is feasible to obtain the deep learning assignment submitted by the user in a predetermined manner, the predetermined manner comprising the web UI manner, then submit the deep learning assignment to the deep learning system so that the deep learning system runs the submitted deep learning assignment. As compared with the prior art, processing such as programming is not needed upon submitting the deep learning assignment in the solutions of the present disclosure, thereby simplifying the user's operations, improving the processing efficiency of the deep learning assignment, and accelerating the user's speed of developing deep learning.

15 Claims, 3 Drawing Sheets

Obtain a deep learning assignment submitted by a user in a predetermined manner, the predetermined manner comprising: a web User Interface UI manner — 101

Submit the deep learning assignment to a deep learning system so that the deep learning system runs the submitted deep learning assignment — 102

(56) References Cited

U.S. PATENT DOCUMENTS

2016/0335539 A1 11/2016 Spagnola
2017/0213126 A1* 7/2017 Hammond ............ G06F 16/951

* cited by examiner

DEEP LEARNING ASSIGNMENT PROCESSING METHOD AND APPARATUS, DEVICE AND STORAGE MEDIUM

The present application claims priority of Chinese Patent Application No. 201710954755.9, filed on Oct. 13, 2017, with the title of "Deep learning assignment processing method and apparatus, device and storage medium". The disclosure of the above applications is incorporated herein by reference in its entirety.

FIELD OF THE DISCLOSURE

The present disclosure relates to deep learning technologies, and particularly to a deep learning assignment processing method and apparatus, a device and a storage medium.

BACKGROUND OF THE DISCLOSURE

Deep learning is a new field in machine learning research, and its motivation is to build a neural network which simulates a human brain for analysis learning, and simulates the human brain's mechanism to explain data such as images, sound and text.

At present, mainstream deep learning frameworks such as Caffe, paddlepaddle and tensorflow all relate to submitting deep learning assignments by running a programming language of the deep learning frameworks, that is to say, the user needs to first program a deep learning program, then run the program to submit the deep learning assignment, which makes the deep learning assignment submitting process relatively complicated, and reduces an efficiency of processing the deep learning assignment.

SUMMARY OF THE DISCLOSURE

In view of the above, the present disclosure provides a deep learning assignment processing method and apparatus, a device and a storage medium, which can improve the processing efficiency of the deep learning assignment.

Specific technical solutions are as follows:

A deep learning assignment processing method, comprising:

obtaining a deep learning assignment submitted by a user in a predetermined manner, the predetermined manner comprising: a web User Interface UI manner;

submitting the deep learning assignment to a deep learning system so that the deep learning system runs the deep learning assignment.

According to a preferred embodiment of the present disclosure, the predetermined manner further comprises:

a Command-Line Interface CLI manner;

a Notebook Style manner.

According to a preferred embodiment of the present disclosure, the submitting the deep learning assignment to a deep learning system comprises:

performing parameter parsing for the deep learning assignment and submitting assignment information at least including a parsing result to the deep learning system.

According to a preferred embodiment of the present disclosure, the method further comprises:

presenting a deep learning assignment management interface for the user so that the user manages the submitted deep learning assignment.

According to a preferred embodiment of the present disclosure, the managing comprises stopping, deleting, and viewing a state.

A deep learning assignment processing apparatus, comprising: an obtaining unit and a managing unit;

the obtaining unit is configured to obtain a deep learning assignment submitted by a user in a predetermined manner, the predetermined manner comprising: a web User Interface UI manner;

the managing unit is configured to submit the deep learning assignment to a deep learning system so that the deep learning system runs the deep learning assignment.

According to a preferred embodiment of the present disclosure, the predetermined manner further comprises:

a Command-Line Interface CLI manner;

a Notebook Style manner.

According to a preferred embodiment of the present disclosure, the managing unit performs parameter parsing for the deep learning assignment and thereby submits assignment information at least including a parsing result to the deep learning system.

According to a preferred embodiment of the present disclosure, the managing unit is further configured to present a deep learning assignment management interface for the user so that the user manages the submitted deep learning assignment.

According to a preferred embodiment of the present disclosure, the managing comprises stopping, deleting, and viewing a state.

A computer device, comprising a memory, a processor and a computer program which is stored on the memory and runnable on the processor, wherein the processor, upon executing the program, implements the above-mentioned method.

A computer-readable storage medium on which a computer program is stored, wherein the program, when executed by a processor, implements the aforesaid method.

As can be seen from the above introduction, according to the above solutions of the present disclosure, it is feasible to obtain the deep learning assignment submitted by the user in a predetermined manner, the predetermined manner comprising the web UI manner, then submit the deep learning assignment to the deep learning system so that the deep learning system runs the submitted deep learning assignment. As compared with the prior art, processing such as programming is not needed in the solutions of the above method embodiments, thereby simplifying the user's operations, improving the processing efficiency of the deep learning assignment, and accelerating the user's speed of developing deep learning.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
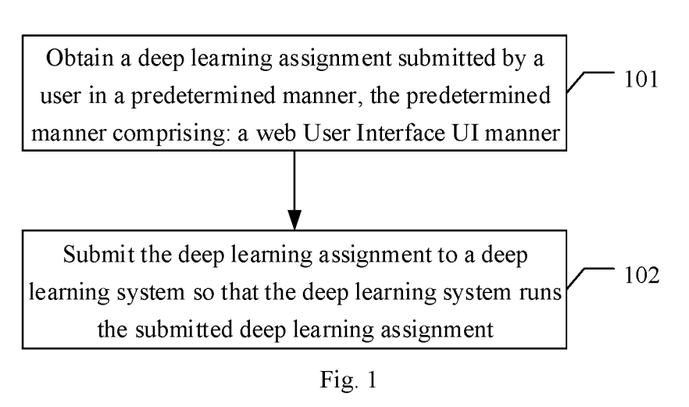
FIG. 1 is a flow chart of a first embodiment of a deep learning assignment processing method according to the present disclosure.

FIG. 1 is a flow chart of a first embodiment of a deep learning assignment processing method according to the present disclosure. As shown in FIG. 1, the embodiment comprises the following specific implementation mode.

At 101, obtain a deep learning assignment submitted by a user in a predetermined manner, the predetermined manner comprising: a web User Interface (UI) manner.

At 102, submit the deep learning assignment to a deep learning system so that the deep learning system runs the submitted deep learning assignment.

As stated above, the user may submit the deep learning assignment in a web UI manner. In addition, in the present embodiment, the user may further submit the deep learning assignment in the following manner: a Command-Line Interface (CLI) manner and a Notebook Style manner. The three manners will be introduced below respectively.

1) CLI Manner

That is, it is feasible to submit the deep learning assignment in the CLI manner on the web page.

For example:

run —cpu 1 —memory 1024 —gpu 1 —jobName test —logPath /log —volume /root:/root —cmd python test.py;

The user may submit a deep learning assignment by submitting the above parameters.

The respective parameters have the following meaning respectively:

cpu: the number of cores of the CPU needed by the assignment;

gpu: the number of cores of the gpu needed by the assignment;

memory: a size of the a memory needed by the assignment;

jobName: a name of a designated assignment;

logPath: a log address;

volume: a mounting path in the assignment;

cmd: a command for the user to run the assignment.

2) Web UI Manner

In this manner, the user may fill the above parameters on the web page, and then click a submit button on the web page to submit the deep learning assignment.

3) Notebook Style Manner

In this manner, it is feasible to serialize the above parameters as a j son string, and submit at a submit window. How to serialize is of prior art.

For example, the user may fill the following j son string at the submit window:

```
{
    "cpu": 1,
    "gpu": 1,
    "memory": 1024,
    "jobName": "test",
    "logPath": "/log",
    "volume": "/root: /root",
    "cmd": "pythontest.py"
};
``` and then click the submit button for submission.

In practical application, which one of CLI, web UI and Notebook Style manners is specifically employed to submit the deep learning assignment may depend on actual needs.

No matter which manner is used by the user to submit the deep learning assignment, it is feasible to, after obtaining the deep learning assignment submitted by the user, perform parameter parsing for it and thereby submit assignment information at least including a parsing result to a deep learning system, and store the assignment information in a database.

The performing parameter parsing for the deep learning assignment means parsing to obtain the number of cores of the cpu needed by the assignment, the number of cores of the gpu needed by the assignment, and the size of the memory needed by the assignment.

The deep learning system automatically runs the submitted deep learning assignment.

In addition, the prior art does not provide a function of managing the deep learning assignment. In the present embodiment, it is feasible to present a deep learning assignment management interface for the user so that the user manages the submitted deep learning assignment. That is, the user can see the already-submitted assignment in the web page and manage the deep learning assignment.

The managing may comprise stopping, deleting, and viewing a state. The state of the deep learning assignment may comprise running and run-completed. The state of the deep learning assignment may be viewed. Stopping means sending an instruction to stop running for the deep learning assignment which is running, and deleting means deleting the deep learning assignment whose run is stopped or already completed.

If the user submits a plurality of deep learning assignments, the user may manage the plurality of deep learning assignments simultaneously on the deep learning assignment management interface.

Figure 2:
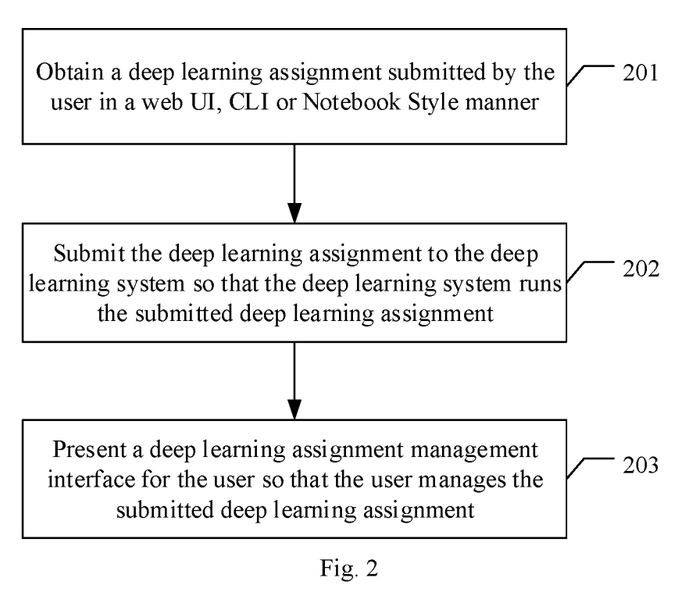
FIG. 2 is a flow chart of a second embodiment of a deep learning assignment processing method according to the present disclosure.

Based on the above introduction, FIG. 2 is a flow chart of a second embodiment of a deep learning assignment processing method according to the present disclosure. As shown in FIG. 2, the embodiment comprises the following specific implementation mode:

At 201, obtaining a deep learning assignment submitted by the user in a web UI, CLI or Notebook Style manner.

Which manner is specifically employed depends on actual needs.

At 202, submit the deep learning assignment to the deep learning system so that the deep learning system runs the submitted deep learning assignment.

Specifically, it is feasible to perform parameter parsing for the obtained deep learning assignment and thereby submit assignment information at least including a parsing result to the deep learning system.

At 203, present a deep learning assignment management interface for the user so that the user manages the submitted deep learning assignment.

The managing may comprise stopping, deleting, and viewing a state.

In practical application, a subject for performing the above operations may be a Web server. Correspondingly, FIG. 3 is a schematic diagram of an interaction manner between a Web Server and a deep learning system (deep learning platform) according to the present disclosure.

Figure 3:
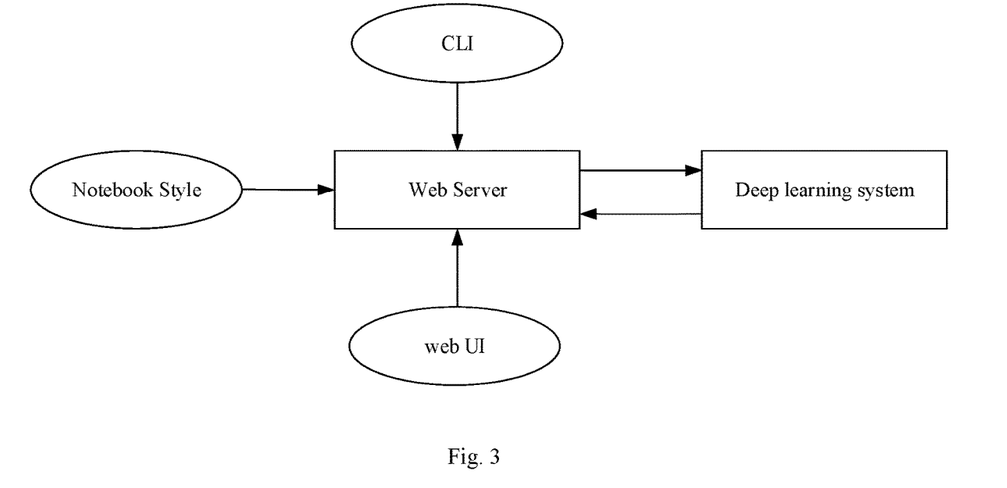
FIG. 3 is a schematic diagram of an interaction manner between a Web Server and a deep learning system according to the present disclosure.

As shown in FIG. 3, the Web Sever obtains a deep learning assignment submitted by the user in a web UI, CLI or Notebook Style manner, submit the deep learning assignment to the deep learning system so that the deep learning system runs the submitted deep learning assignment. In addition, the Web Server may provide the user with the states of the deep learning assignments by performing information interaction with the deep learning system in real time, so that the user may manage the submitted deep learning assignment.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

In summary, by using the solutions of the above method embodiments, the user may submit the deep learning assignment in the CLI, web UI or Notebook Style manner, the deep learning system may run the submitted deep learning assignment, and the user may manage the submitted deep learning assignment, and perform an operation for the assignment such as stopping, deleting or viewing a state.

As compared with the prior art, processing such as programming is not needed in the solutions of the above method embodiments, thereby simplifying the user's operations, improving the processing efficiency of the deep learning assignment, and accelerating the user's speed of developing deep learning.

In addition, the solutions stated in the above method embodiments integrate the deep learning assignment management function, and assist the user in managing the submitted deep learning assignments.

The above introduces the method embodiments. The solution of the present disclosure will be further described through an apparatus embodiment.

Figure 4:
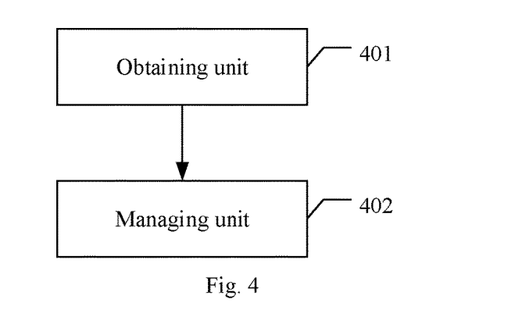
FIG. 4 is a structural schematic diagram of components of an embodiment of a deep learning assignment processing apparatus according to the present disclosure.

FIG. 4 is a structural schematic diagram of components of an embodiment of a deep learning assignment processing apparatus according to the present disclosure. As shown in FIG. 4, the apparatus comprises: an obtaining unit 401 and a managing unit 402.

The obtaining unit 401 is configured to obtain a deep learning assignment submitted by a user in a predetermined manner, the predetermined manner comprising: a web User Interface (UI) manner.

The managing unit 402 is configured to submit the deep learning assignment to a deep learning system so that the deep learning system runs the deep learning assignment.

As stated above, the user may submit the deep learning assignment in the web UI manner. In addition, in the present embodiment, the user may further submit the deep learning assignment in the following manner: a Command-Line Interface (CLI) manner and a Notebook Style manner. The three manners will be introduced below respectively.

1) CLI Manner

That is, it is feasible to submit the deep learning assignment in the CLI manner on the web page.

For example:

run —cpu 1 —memory 1024 —gpu 1 —jobName test —logPath /log —volume /root:/root —cmd python test.py;

The user may submit a deep learning assignment by submitting the above parameters.

The respective parameters have the following meaning respectively:

cpu: the number of cores of the CPU needed by the assignment;

gpu: the number of cores of the gpu needed by the assignment;

memory: a size of the a memory needed by the assignment;

jobName: a name of a designated assignment;

logPath: a log address;

volume: a mounting path in the assignment;

cmd: a command for the user to run the assignment.

2) Web UI Manner

In this manner, the user may fill the above parameters on the web page, and then click a submit button on the web page to submit the deep learning assignment.

3) Notebook Style manner

In this manner, it is feasible to serialize the above parameters as a j son string, and submit at a submit window. How to serialize is of prior art.

For example, the user may fill the following j son string at the submit window:

```
{
    "cpu": 1,
    "gpu": 1,
    "memory": 1024,
    "jobName": "test",
    "logPath": "/log",
    "volume": "/root: /root",
    "cmd": "pythontest.py"
};
``` and then click the submit button for submission.

In practical application, which one of CLI, web UI and Notebook Style manners is specifically employed to submit the deep learning assignment may depend on actual needs.

No matter which manner is used by the user to submit the deep learning assignment, the managing unit 402, after obtaining the deep learning assignment submitted by the user, performs parameter parsing for it and thereby submit assignment information at least including a parsing result to the deep learning system, so that the deep learning system runs the submitted deep learning assignment.

In addition, the managing unit 402 may further present a deep learning assignment management interface for the user so that the user manages the submitted deep learning assignment.

The managing may comprise stopping, deleting, and viewing a state. If the user submits a plurality of deep learning assignments, the user may manage the plurality of deep learning assignments simultaneously on the deep learning assignment management interface.

Reference may be made to corresponding depictions in the aforesaid method embodiments for a specific workflow of the apparatus embodiments shown in FIG. 4. The workflow is not detailed any more.

In summary, by using the solution of the above apparatus embodiment, the user may submit the deep learning assignment in the CLI, web UI or Notebook Style manner, the deep learning system may run the submitted deep learning assignment, and the user may manage the submitted deep learning assignment, and perform an operation for the assignment such as stopping, deleting or viewing a state.

As compared with the prior art, processing such as programming is not needed in the solution of the above apparatus embodiment, thereby simplifying the user's operations, improving the processing efficiency of the deep learning assignment, and accelerating the user's speed of developing deep learning.

In addition, the solution stated in the above apparatus embodiment integrates the deep learning assignment management function, and assists the user in managing the submitted deep learning assignments.

Figure 5:
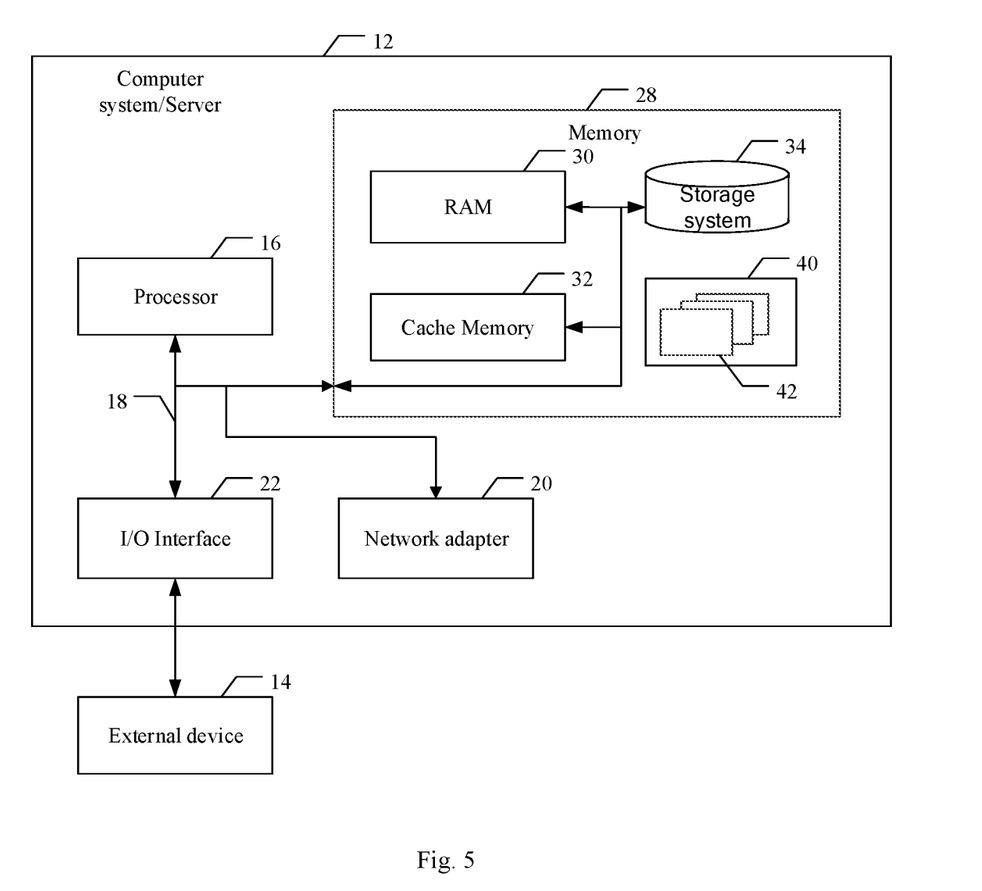
FIG. 5 illustrates a block diagram of an example computer system/server 12 adapted to implement an implementation mode of the present disclosure.

FIG. 5 illustrates a block diagram of an example computer system/server 12 adapted to implement an implementation mode of the present disclosure. The computer system/server 12 shown in FIG. 5 is only an example and should not bring about any limitation to the function and scope of use of the embodiments of the present disclosure.

As shown in FIG. 5, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 5, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1 or 2.

The present disclosure meanwhile provides a computer-readable storage medium on which a computer program is stored, the program, when executed by the processor, implementing the method stated in the embodiment shown in FIG. 1 or 2.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A deep learning assignment processing method, wherein the method comprises:
   obtaining a deep learning assignment submitted by a user in a predetermined manner, the predetermined manner comprising: a web User Interface UI manner;
   submitting the deep learning assignment to a deep learning system so that the deep learning system runs the deep learning assignment,
   wherein the deep learning assignment is submitted by the user by submitting the following parameters:
   the number of cores of the CPU needed by the assignment;
   the number of cores of the gpu needed by the assignment;
   a size of the a memory needed by the assignment;
   a name of a designated assignment;
   a log address;
   a mounting path in the assignment; and
   a command for the user to run the assignment.

2. The method according to claim 1, wherein the predetermined manner further comprises:
   a Command-Line Interface CLI manner;
   a Notebook Style manner.

3. The method according to claim 1, wherein the submitting the deep learning assignment to a deep learning system comprises:
   performing parameter parsing for the deep learning assignment and submitting assignment information at least including a parsing result to the deep learning system.

4. The method according to claim 1, wherein the method further comprises:
   presenting a deep learning assignment management interface for the user so that the user manages the submitted deep learning assignment.

5. The method according to claim 4, wherein the managing comprises stopping, deleting, and viewing a state.

6. A computer device, comprising:
   a memory;
   a processor; and
   a computer program which is stored on the memory and runnable on the processor, wherein the processor, upon executing the program, implements a deep learning assignment processing method, wherein the method comprises:
   obtaining a deep learning assignment submitted by a user in a predetermined manner, the predetermined manner comprising: a web User Interface UI manner;
   submitting the deep learning assignment to a deep learning system so that the deep learning system runs the deep learning assignment, wherein the deep learning assignment is submitted by the user by submitting the following parameters:
   the number of cores of the CPU needed by the assignment;
   the number of cores of the gpu needed by the assignment;
   a size of the a memory needed by the assignment;
   a name of a designated assignment;
   a log address;
   a mounting path in the assignment; and
   a command for the user to run the assignment.

7. The computer device according to claim 6, wherein the predetermined manner further comprises:
   a Command-Line Interface CLI manner;
   a Notebook Style manner.

8. The computer device according to claim 6, wherein the submitting the deep learning assignment to a deep learning system comprises:
   performing parameter parsing for the deep learning assignment and submitting assignment information at least including a parsing result to the deep learning system.

9. The computer device according to claim 6, wherein the method further comprises:
   presenting a deep learning assignment management interface for the user so that the user manages the submitted deep learning assignment.

10. The computer device according to claim 9, wherein the managing comprises stopping, deleting, and viewing a state.

11. A non-transitory computer-readable storage medium on which a computer program is stored, wherein the program, when executed by a processor, implements a deep learning assignment processing method, wherein the method comprises:
- obtaining a deep learning assignment submitted by a user in a predetermined manner, the predetermined manner comprising: a web User Interface UI manner;
- submitting the deep learning assignment to a deep learning system so that the deep learning system runs the deep learning assignment, wherein the deep learning assignment is submitted by the user by submitting the following parameters:
- the number of cores of the CPU needed by the assignment;
- the number of cores of the GPU needed by the assignment;
- a size of the a memory needed by the assignment;
- a name of a designated assignment;
- a log address;
- a mounting path in the assignment; and
- a command for the user to run the assignment.

12. The non-transitory computer-readable storage medium according to claim 11, wherein
the predetermined manner further comprises:
- a Command-Line Interface CLI manner;
- a Notebook Style manner.

13. The non-transitory computer-readable storage medium according to claim 11, wherein
the submitting the deep learning assignment to a deep learning system comprises:
performing parameter parsing for the deep learning assignment and submitting assignment information at least including a parsing result to the deep learning system.

14. The non-transitory computer-readable storage medium according to claim 11, wherein
the method further comprises:
presenting a deep learning assignment management interface for the user so that the user manages the submitted deep learning assignment.

15. The non-transitory computer-readable storage medium according to claim 14, wherein
the managing comprises stopping, deleting, and viewing a state.

* * * * *